United States Patent
Inui (10) Patent No.: US 6,558,101 B2
(45) Date of Patent: May 6, 2003

(54) ARTICLE STORAGE SYSTEM

(75) Inventor: Yoshitaka Inui, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/055,464

(22) Filed: Jan. 22, 2002

(65) Prior Publication Data

US 2002/0114685 A1 Aug. 22, 2002

(30) Foreign Application Priority Data

Feb. 22, 2001 (JP) ........................................ 2001-045881

(51) Int. Cl.[7] .............................. H01L 21/68; B65G 1/04
(52) U.S. Cl. ...................... 414/267; 414/281; 414/282; 414/940
(58) Field of Search ................................ 414/267, 281, 414/282, 940

(56) References Cited

U.S. PATENT DOCUMENTS 5,980,183 A  * 11/1999 Fosnight ................. 414/281 X

FOREIGN PATENT DOCUMENTS

| JP | 55-163857 | 12/1980 |
|----|-----------|---------|
| JP | 4-18447   | 2/1992  |

* cited by examiner

Primary Examiner—Steven A. Bratlie
(74) Attorney, Agent, or Firm—Schweitzer Cornman Gross & Bondell LLP

(57) ABSTRACT

The object of the present invention is to reduce the number of shelves for supporting articles in an article storage system for storage of articles such as containers. The storage system includes a shelf 12 for supporting a container 2 having an engaging means 8 formed at an upper portion thereof. The storage system also includes a loader/unloader 4 for loading the container 2 on and unloading it from the shelf 12. The shelf 12 includes a deck 20 formed on the upper side thereof, on which the container 2 can be placed. The shelf 12 also includes a pair of right and left engaging parts 16 formed on the lower side thereof for engaging with the engaging means 8 of the container 2 to hold the container 2 hanging from the shelf 12. The engaging means 8 and the pair of engaging parts 16 can engage with and disengage from each other in the directions in which the container 2 can be loaded and unloaded.

4 Claims, 13 Drawing Sheets

PRIOR ART

FIG. 13

PRIOR ART

ARTICLE STORAGE SYSTEM

TECHNICAL FIELD OF THE INVENTION

The present invention relates to an article storage system for handling containers as articles, which may contain semiconductors (wafers).

CONVENTIONAL ART

A conventionally known article storage system of this type includes a rack for storing articles in it and a loader/unloader for loading and unloading the rack.

Japanese patent laid-open publication No. 5-294410 discloses a loader/unloader including a carriage that can run along the front of a shelf, a post standing on the carriage, a lift supported and guided by the post, and a protruder/retractor carried by the lift. The lift includes a rotary table.

The protruder/retractor includes a folding arm mounted on the rotary table of the lift and an article support (fork) connected to the free end of the arm. The rotation of the rotary table causes the folding arm to protrude and retract the article support relative to the shelf.

Figure 11A:
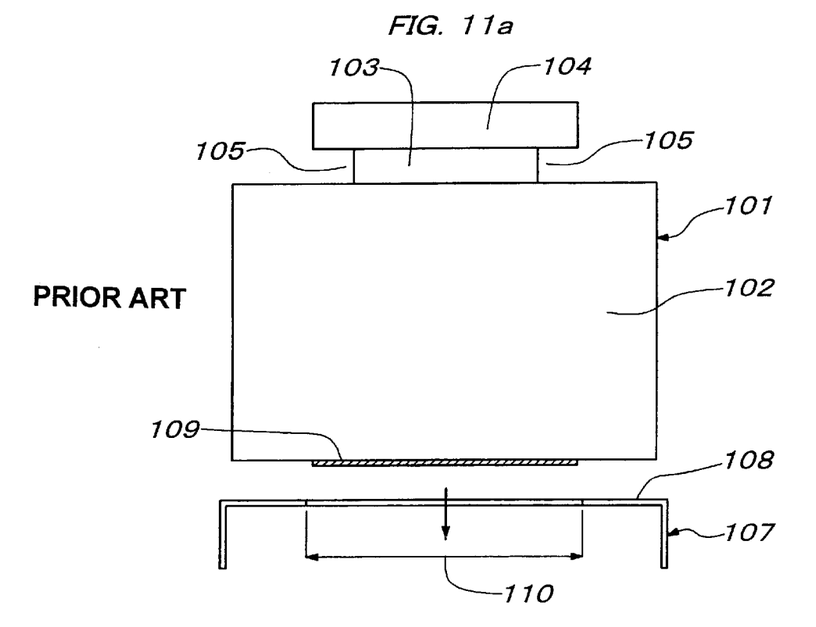
Figure 11B:
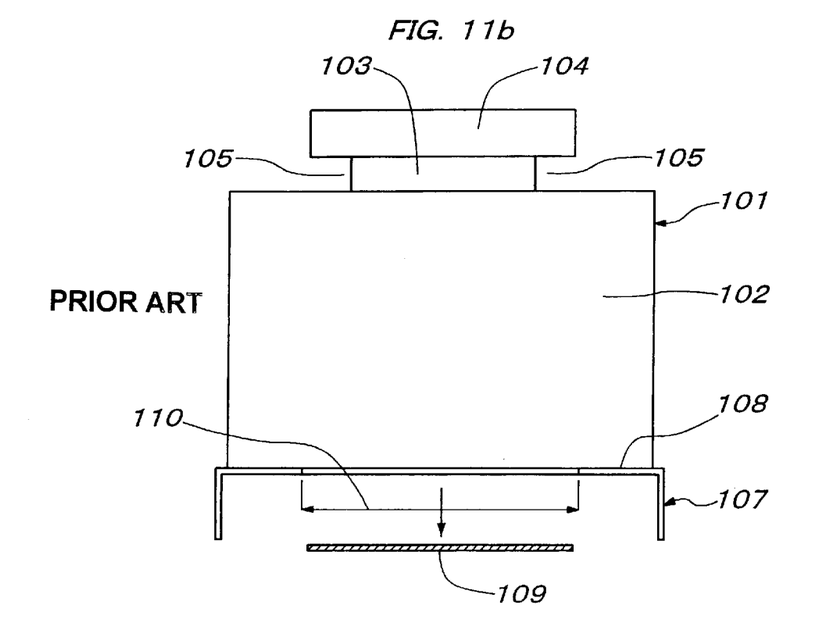

FIGS. 11a and 11b show a container 101 containing semiconductors (wafers) as articles handled by the known storage system. The container 101 consists of a body 102 including a storage section, where the semiconductors are stored, a neck 103 and a head 104. The neck 103 connects the head 104 and body 102 together and is narrower than them. The head 104 and body 102 define an engaging space 105 between them around the neck 103. The engaging space 105 may generally be used for a robot or another transferrer to catch or hold the container 101 while the container is carried.

Figure 12:
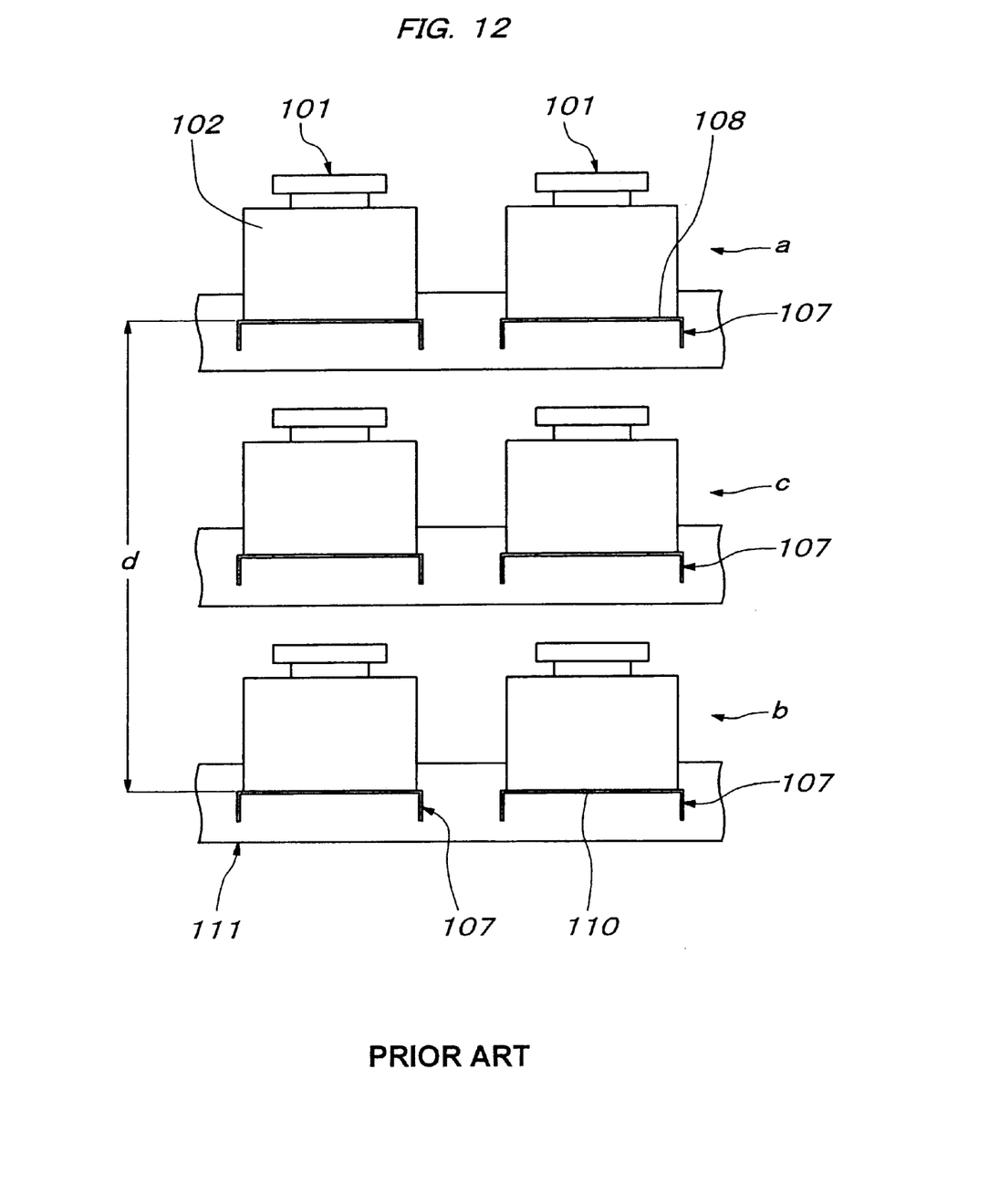
FIG. 12 is a front view of the rack of the conventional storage system, showing containers being held on shelves of this system.
Figure 13:
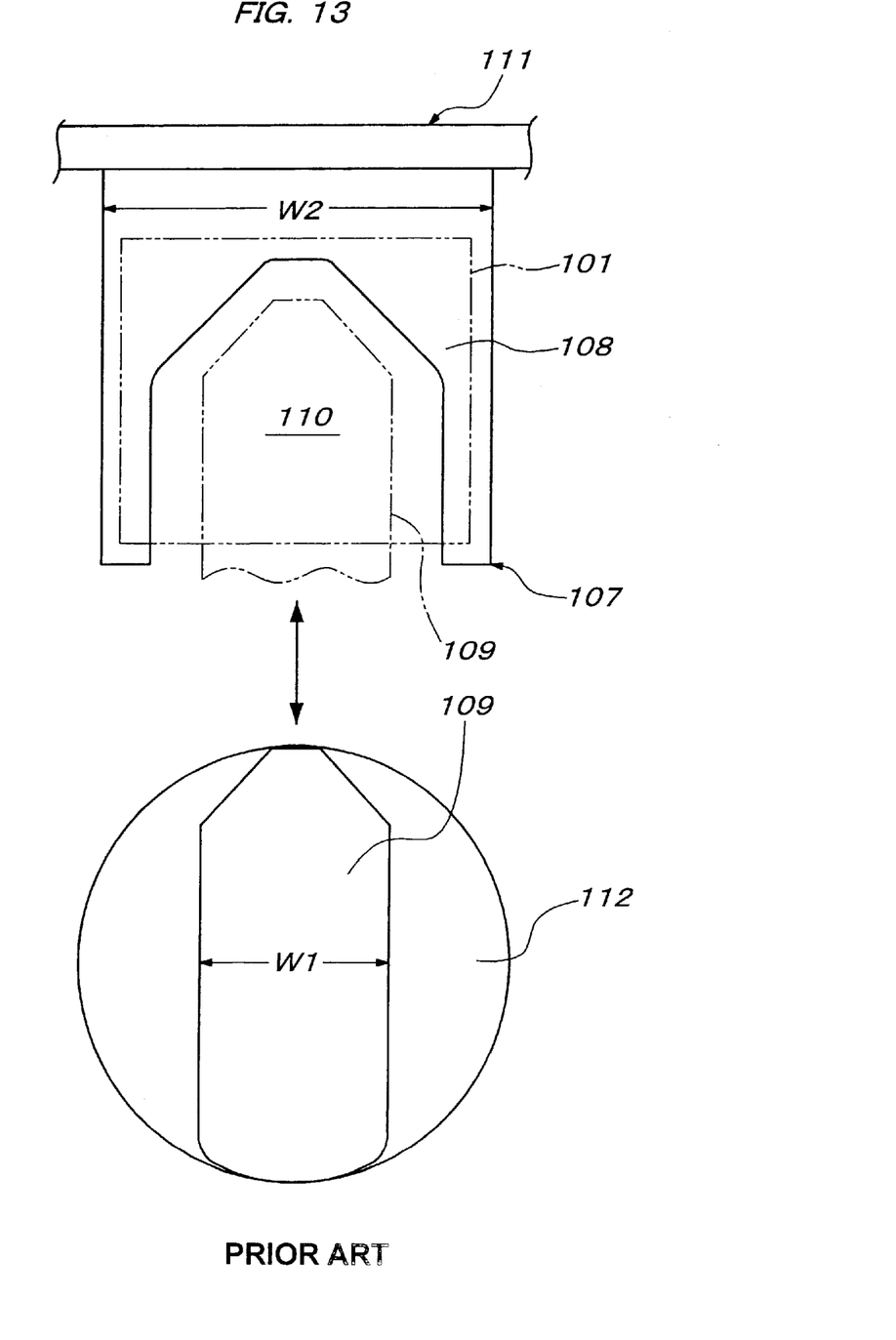
FIG. 13 is a plan view showing a shelf and the article support (fork) of the conventional storage system.

FIGS. 11–13 show a rack consisting of vertically spaced horizontal rows of shelves 107. Each shelf 107 includes a deck 108 formed on its top side, where a container 101 can be placed and supported. Each shelf 107 has a space 110 formed through it, through which the article support (fork) 109 of the protruder/retractor can move relatively up and down.

The loader/unloader can load containers 101 on and unload containers 101 from the rack 111. As shown in FIG. 11a, the process for loading a container 101 on each shelf 107 includes protruding the article support 109 of the protruder/retractor from its retracted position over the rotary table 112 of the lift to a position (shown with two-dot chain lines in FIG. 13) over the shelf 107, with the container 101 supported on the support 109. Subsequently, the lift of the loader/unloader is moved downward so that, as shown in FIG. 11b, the article support 109 can move downward through the space 110 of the shelf 107. This transfers the container 101 from the article support 109 onto the deck 108 of the shelf 107, where the container 101 can be stored. Thereafter, as shown with solid lines in FIG. 13, the empty support 109 positioned under the shelf 107 is retracted to its retracted position over the rotary table 112 of the lift.

It is possible to unload a container 101 from each shelf 107 by operating the article support 109 with the process reverse to the loading process.

Problem to be Solved by the Invention

As shown in FIG. 12, one container 101 can be placed on each shelf 107. Therefore, the storage of a number of containers 101 in the rack 111 needs the same number of shelves 107, and the storage of a large number of containers 101 in the rack 111 needs the large number of shelves 107, raising the cost.

For storage of containers 101 in three vertically spaced horizontal rows a, b and c in the rack 111, it is necessary to provide shelves 107 for the middle row c between the top row a and bottom row b. This increases the vertical distance d between the shelves 107 for the top row a and bottom row b, increasing the height of the rack 111.

As shown in FIG. 13, the width W1 of the article support 109 of the loader/unloader is narrower than the width W2 of each shelf 107. Consequently, when the lift of the loader/unloader moves up and down with a container 101 supported on the article support 109, and when the carriage runs with a container 101 so supported, the container (article) 101 on the article support (fork) 109 may be unstable.

DETAILED DESCRIPTION OF THE INVENTION

The object of the present invention is to provide an article storage system including a rack lower in height that consists of a smaller number of shelves and a fork that can more stably support an article.

An article storage system according to the present invention is an article storage system for storing therein an article having engaging means. The storage system includes a shelf for supporting the article and a loader/unloader for loading and unloading the shelf. The shelf includes a deck formed on the upper side thereof, on which the article can be placed. The shelf also includes an engaging part formed on the lower side thereof for engaging with the engaging means of the article to hold the article under the shelf. The engaging means and the engaging part can engage with and disengage from each other in the directions in which the article can be loaded and unloaded.

It is possible to store the article in the storage system by either placing the article on the shelf or holding the article hanging from the shelf. Specifically, the article supported by the loader/unloader can be placed on the deck on the upper side of the shelf, or the engaging means of the article supported by the loader/unloader can be engaged with the engaging part on the lower side of the shelf. This makes it possible to support two articles on the upper and lower sides of one shelf. It is consequently possible to greatly reduce the number of shelves to lower the cost in comparison with the conventional system.

The article may have a positioning hole formed in the bottom thereof. The loader/unloader and the shelf deck may each include a positioning protrusion that can engage with and disengage from the positioning hole.

In this case, it is possible to place the article on the shelf deck, with the positioning protrusion of the deck inserted into the positioning hole of the article so that the article can be positioned reliably on the deck. This prevents the article from shifting on and falling from the deck due to an earthquake or another vibration. The loader/unloader can load and unload the article, with the positioning protrusion of the loader/unloader inserted into the positioning hole of the article so that the article can be positioned reliably relative to the loader/unloader as well. Therefore, the article can be put into storage and taken out of storage without shifting so greatly due to vibration of the operating loader/unloader that the article cannot be transferred normally to the shelf, or without falling from the loader/unloader.

The shelf may consist of vertically spaced horizontal rows of shelves. The loader/unloader may consist of a movable unit that can move vertically and horizontally and a fork carried by the movable unit for moving toward and away from the shelf to scoop the article. The positioning protrusion may be formed on the fork.

In this case, it is possible to load an article on each shelf and unload the article from the shelf by moving the movable unit of the loader/unloader vertically and horizontally to position the fork in front of the shelf. By making the positioned fork carry out a series of article transferring operations, it is possible to load the article on and unload the article from either the upper side or the lower side of the shelf. The transferring operations include protruding the fork toward the shelf, moving the fork vertically and retracting the fork toward the movable unit. When the article supported by the fork is put into storage and taken out of storage in this way, the positioning protrusion of the fork is inserted into the positioning hole of the article. This positions the article relative to the fork, preventing the article from shifting so greatly on the fork due to vibration of the moving fork that the article cannot be transferred normally to the shelf, or from falling off the fork.

For storage of three vertically spaced horizontal rows of articles, there is no need for middle shelves between the top and bottom shelves as is necessary for the conventional storage system. The omission of the middle shelves reduces the space between the top and bottom shelves, lowering the height of the rack consisting of vertically spaced horizontal rows of shelves.

The fork may be wider than the shelf and formed with a space through which the shelf can move vertically relative to the fork.

In this case, when the shelf is loaded and unloaded by means of the fork of the loader/unloader, the shelf moves up and down relatively through the space of the fork. Therefore, while the fork is operating, it does not interfere with the shelf. Because the fork is wider than the shelf, however, the fork can stably support an article.

The specific structure and operation of the present invention should be understood more easily from the following description of a preferred embodiment of the invention with reference to the accompanying drawings.

BRIEF DESCRIPTION OF THE DRAWINGS

FIGS. 4a and 4b show the movement of the fork in the case of a container being stored on the upper side of a shelf of the storage system. FIG. 4a shows the container having been moved to a position over or above the deck of the shelf. FIG. 4b shows the container being placed on the shelf deck.

FIGS. 5a and 5b show the movement of the fork in the case of a container being stored on the lower side of a shelf of the storage system. FIG. 5a shows the container head having been inserted into the space between both side plates of the shelf. FIG. 5b shows the container being hung from the shelf.

FIGS. 11a and 11b show the movement of the article support (fork) of a conventional storage system in the case of a container being stored on a shelf of this system. FIG. 11a shows the container having been moved to a position over or above the deck of the shelf. FIG. 11b shows the container being placed on the shelf deck.

EMBODIMENT OF THE INVENTION

An embodiment of the present invention is described below with reference to FIGS. 1–10.

Figure 7:
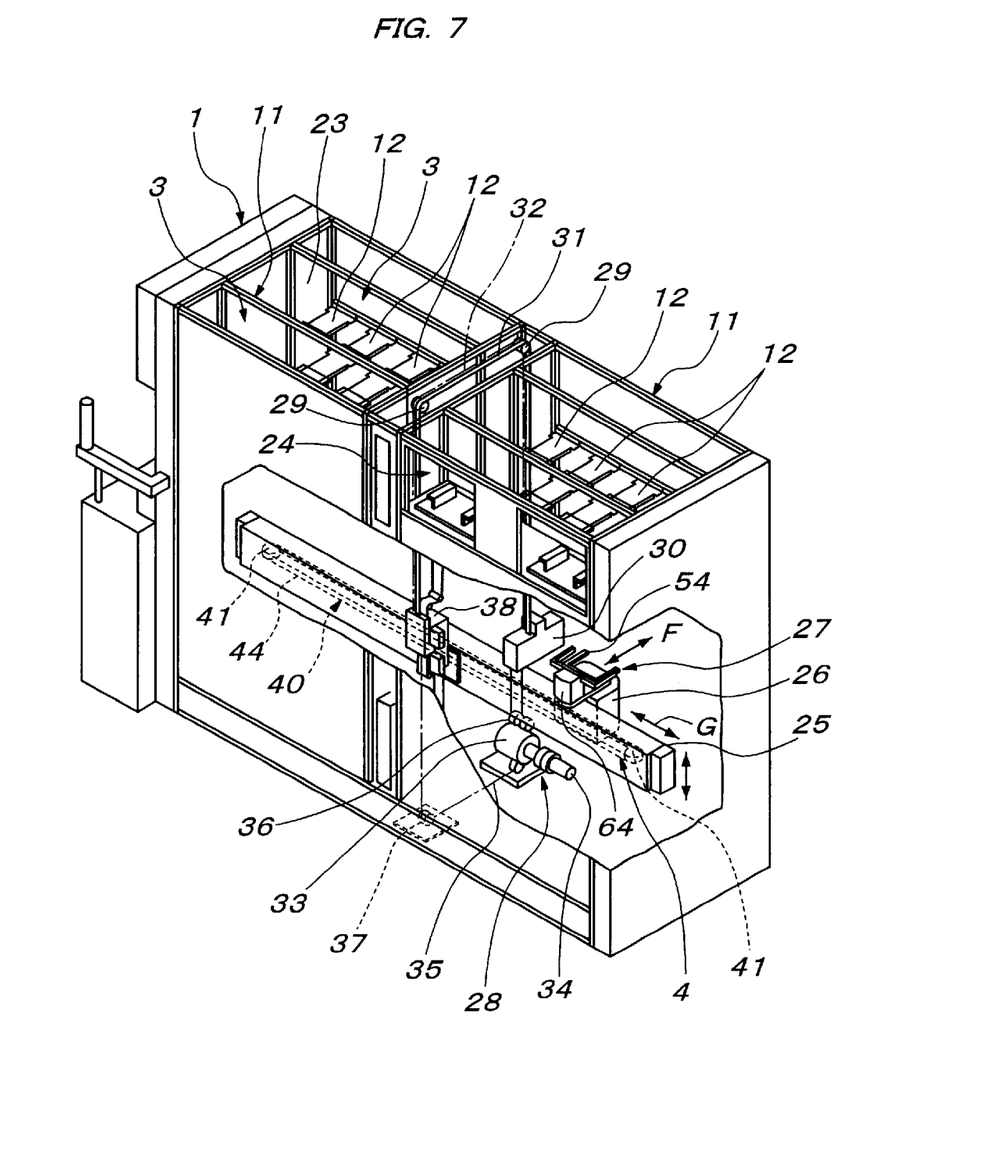
FIG. 7 is a partially broken perspective view of the storage system.

FIG. 7 shows an article storage system 1 for storing a number of containers 2 in it, which may be open-front incorporate pods or hoops. The storage system 1 consists of a pair of front and rear racks 3 for supporting containers 2 and a loader/unloader 4 for loading the racks 3 with containers 2 and unloading the racks 3.

Figure 3:
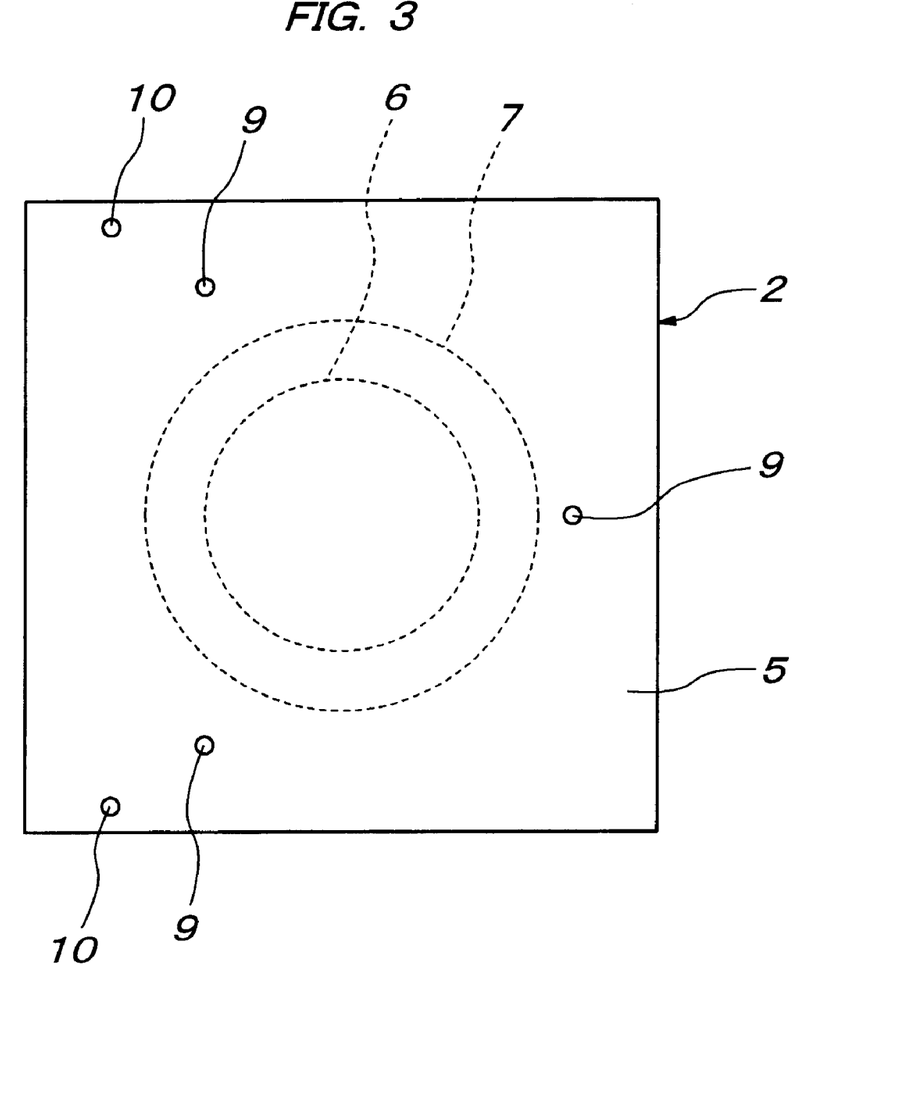
FIG. 3 is a bottom view of a container that can be stored in the storage system.
Figure 4A:
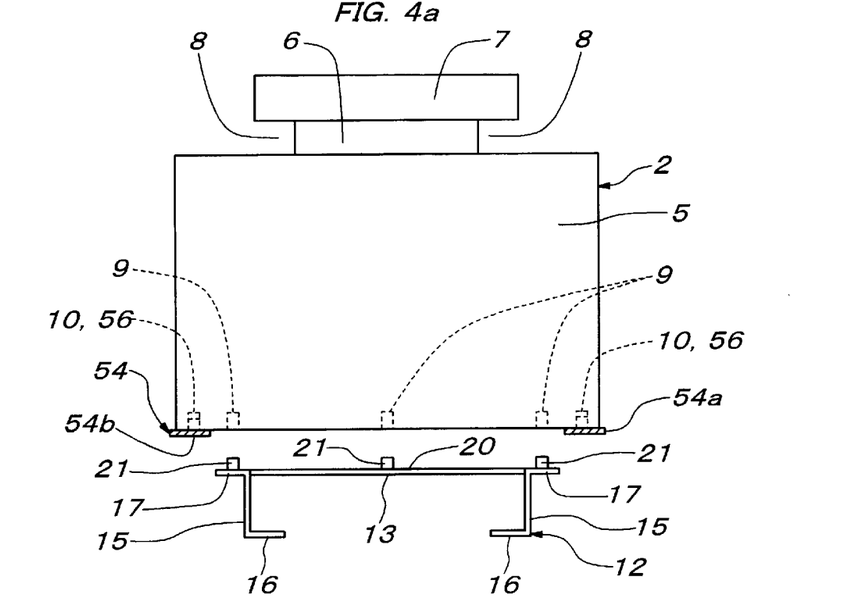
Figure 4B:
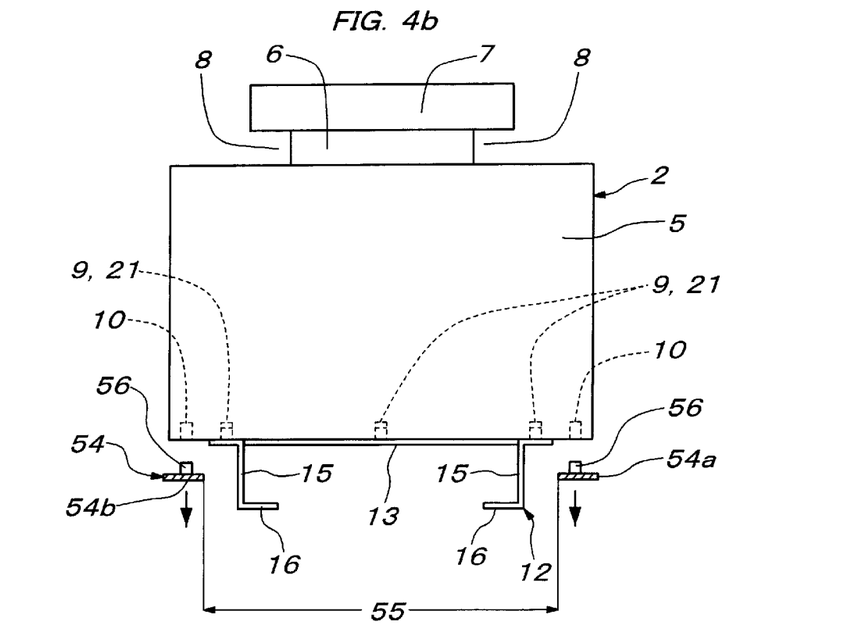

As shown in FIGS. 4a and 4b, each container 2 consists of a body 5 for containing a number of semiconductors (wafers), a neck 6 and a head 7. The neck 6 connects the body 5 and head 7 together and is narrower than them. The head 7 and body 5 define an engaging space 8 between them around the neck 6. The engaging space 8 may in general be used for a robot or another transferrer to catch or hold the container 2 while the container 2 is carried. As shown in FIG. 3, the bottom of the container body 5 has three inner positioning holes 9 and two outer positioning holes 10 outside the holes 9.

Figure 6:
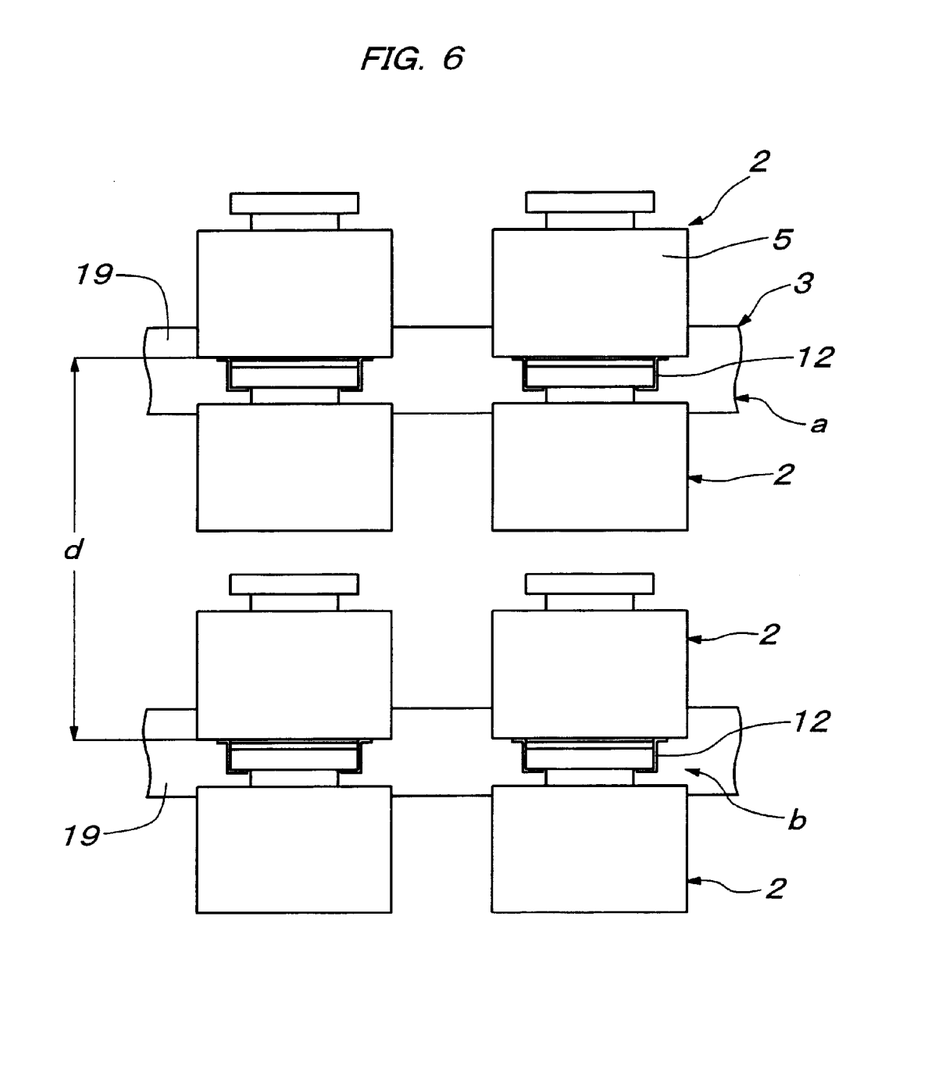
FIG. 6 is a front view of a rack of the storage system, showing containers being held on the upper and lower sides of each shelf of the storage system.

As shown in FIG. 7, each rack 3 includes a frame 11 and shelves 12, which are supported in the frame 11. The frame 11 includes struts and cross members 19. As shown in FIG. 6, the shelves 12 support containers 2 and spaced vertically and horizontally at predetermined distances from each other.

Figure 1:
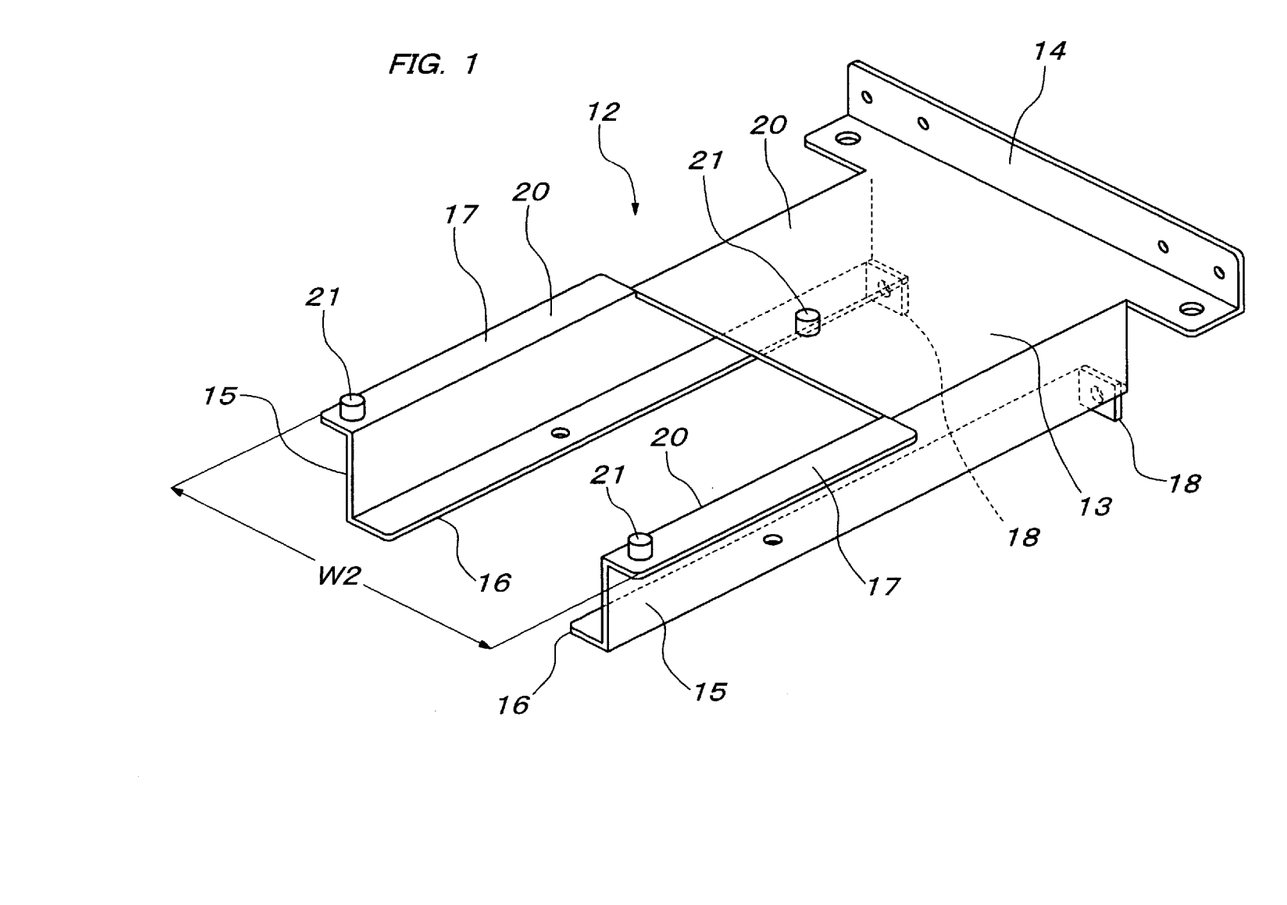
FIG. 1 is a perspective view of a shelf of an article storage system according to an embodiment of the present invention.
Figure 2:
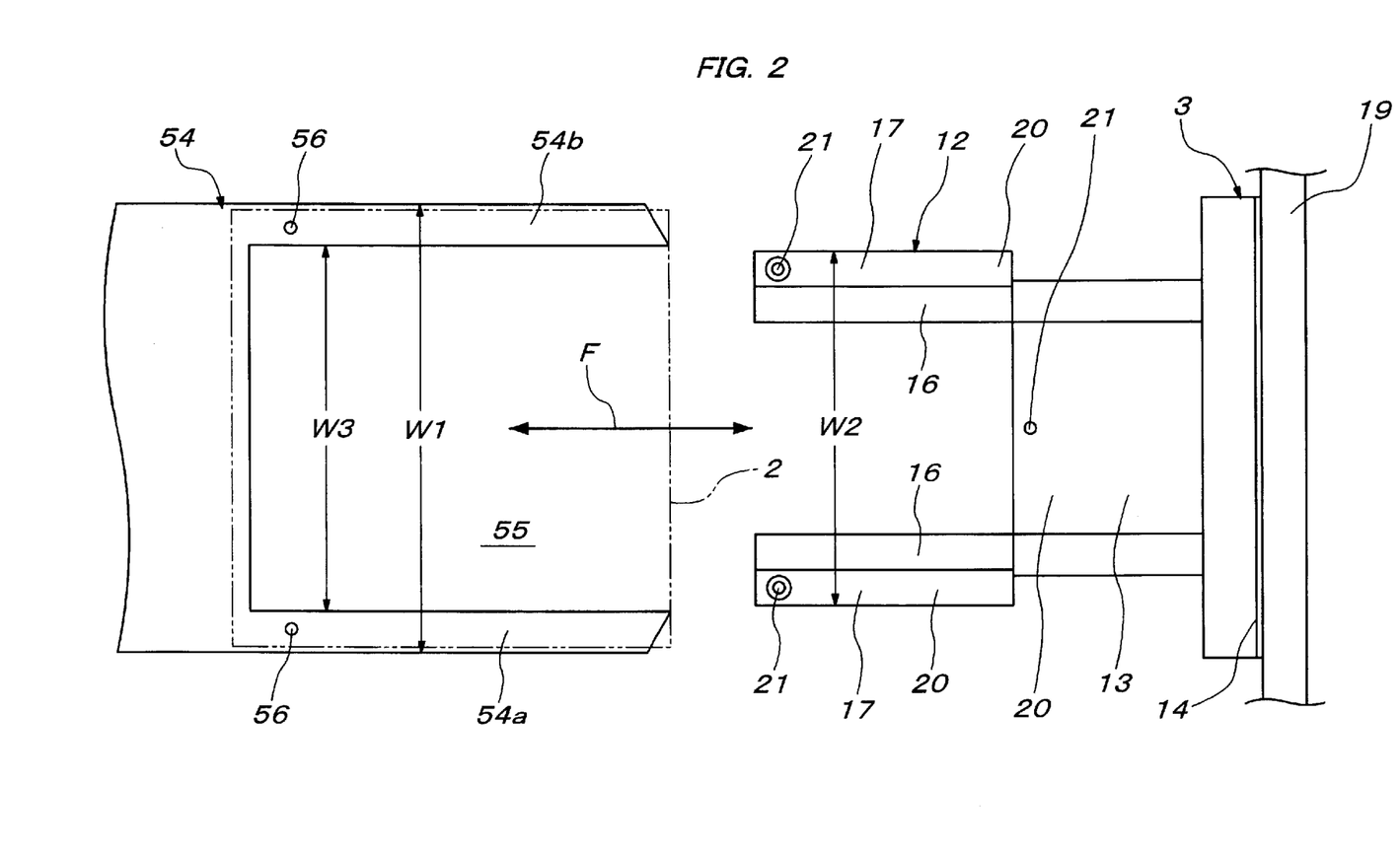
FIG. 2 is a plan view of a shelf and the fork of the loader/unloader of the storage system.

As shown in FIGS. 1 and 2, each shelf 12 consists of a flat horizontal plate 13, an upper vertical fitting plate 14, a pair of vertical side plates 15, a pair of horizontal engaging flanges 16, a pair of upper horizontal flanges 17 and a pair of lower vertical fitting plates 18. The upper fitting plate 14 rises from the rear end of the horizontal plate 13. Each side plate 15 extends downward from one side of the horizontal plate 13. Each engaging flange 16 extends inward from the bottom of one side plate 15. Each upper flange 17 extends outward from the top of one side plate 15. Each lower fitting plate 18 extends downward from the rear end of one engaging flange 16.

The shelves 12 are fixed to the frame 11, with their upper and lower fitting plates 14 and 18 connected to cross members 19 of the frame 11 by bolts or the like. The front halves of the side plates 15 extend forward from the horizontal plate 13. Each upper flange 17 extends from the top of the front half of the associated side plate 15. The top faces of the horizontal plate 13 and upper flanges 17 are flush with each other, forming a deck (platform) 20, on which a container 2 can be placed.

The engaging flanges 16 can engage with the engaging space 8 of a container 2 to hold the container hanging from the shelf 12. The engaging space 8 can engage with and disengage from the engaging flanges 16 in the forward and backward directions F, in which the container 2 can be loaded and unloaded, respectively. The deck 20 has three inner positioning pins 21 protruding upward from it for engagement with the inner positioning holes 9 (FIG. 3) of the container 2. One positioning pin 21 is provided on a front portion of the horizontal plate 13. The other two pins 21 are provided on front portions of the upper flanges 17.

As shown in FIG. 7, a passage 23 is formed between the front and rear racks 3, one of which is formed with a container handler 24 for putting containers 2 into storage and taking containers 2 out of storage. The loader/unloader 4 includes a lift 25, a movable unit 26 and a protruder/retractor 27. The lift 25 is provided in the passage 23 and has a length nearly equal to its length. The lift 25 can move up and down, and supports and guides the movable unit 26 in such a manner that the movable unit 26 can reciprocate in the direction G along the passage 23. The movable unit 26 supports the protruder/retractor 27.

The lift 25 takes the form of a tubular frame and is fitted with a boxy frame 38 in the middle of its length. The lift 25 can be moved up and down by a lift drive 28. The lift drive 28 includes guide wheels 29, a lifting belt 31, an auxiliary wire 32, a drive pulley 33, a motor 34, a wire 35, sheaves 36 and a guide wheel 37. The lifting belt 31 and auxiliary wire 32 are passed via the guide wheels 29. The boxy frame 38 hangs on one end of the lifting belt 31 and one end of the auxiliary wire 32, while a balance weight 30 hangs on the other ends. The drive pulley 33 is provided near the bottom of the storage system 1 and can be rotated in opposite (both) directions by the motor 34. The wire 35 is passed via the drive pulley 33. One end of the wire 35 is connected to the boxy frame 38, while the other end is connected to the balance weight 30. The sheaves 36 enable the wire 35 to be wound around the drive pulley 33. The guide wheel 37 guides the wire 35 upward to the boxy frame 38.

When the motor 34 rotates the drive pulley 33 in opposite directions, the wire 35 and lifting belt 31 move the lift 25 up and down. While the lift 25 is moved up and down, it is guided by a suitable guide (not shown) along the racks 3. The balance weight 30 serves to reduce the load applied while the lift 25 is lifted.

Figure 8:
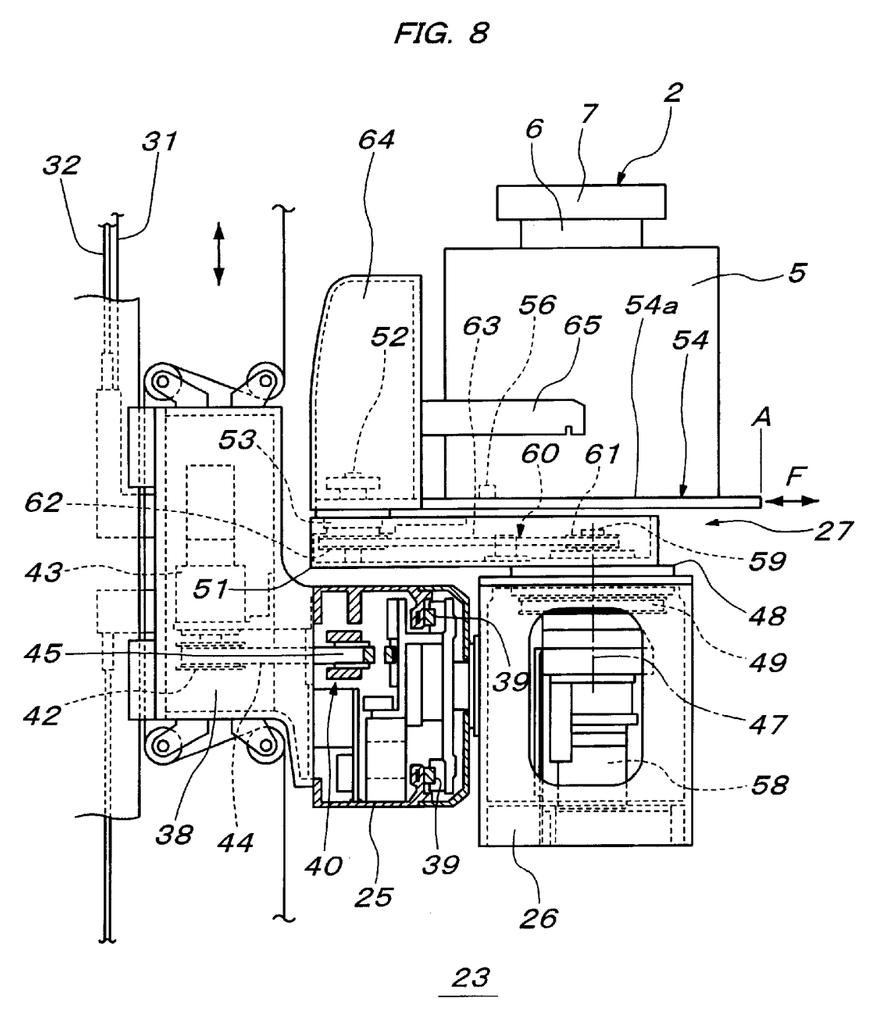
FIG. 8 is a partially broken side view of the protruder/retractor of the loader/unloader of the storage system.

As shown in FIGS. 7 and 8, the lift 25 includes a slide guide 39 housed in it for guiding the movable unit 26, which can be reciprocated by a reciprocating drive 40. The reciprocating drive 40 includes a pair of guide pulleys 41, a drive pulley 42, a motor 43, a timing belt 44 and a tension pulley 45. Each guide pulley 41 is supported in one end portion of the lift 25. The drive pulley 42 is supported in the boxy frame 38 and can be rotated in opposite directions by the motor 43, which is mounted in this frame 38. The timing belt 44 is passed via the guide pulleys 41 and drive pulley 42, and connected to the movable unit 26. When the motor 43 is rotated in opposite directions, the timing belt 44 is driven in opposite directions to reciprocate the movable unit 26.

Figure 9:
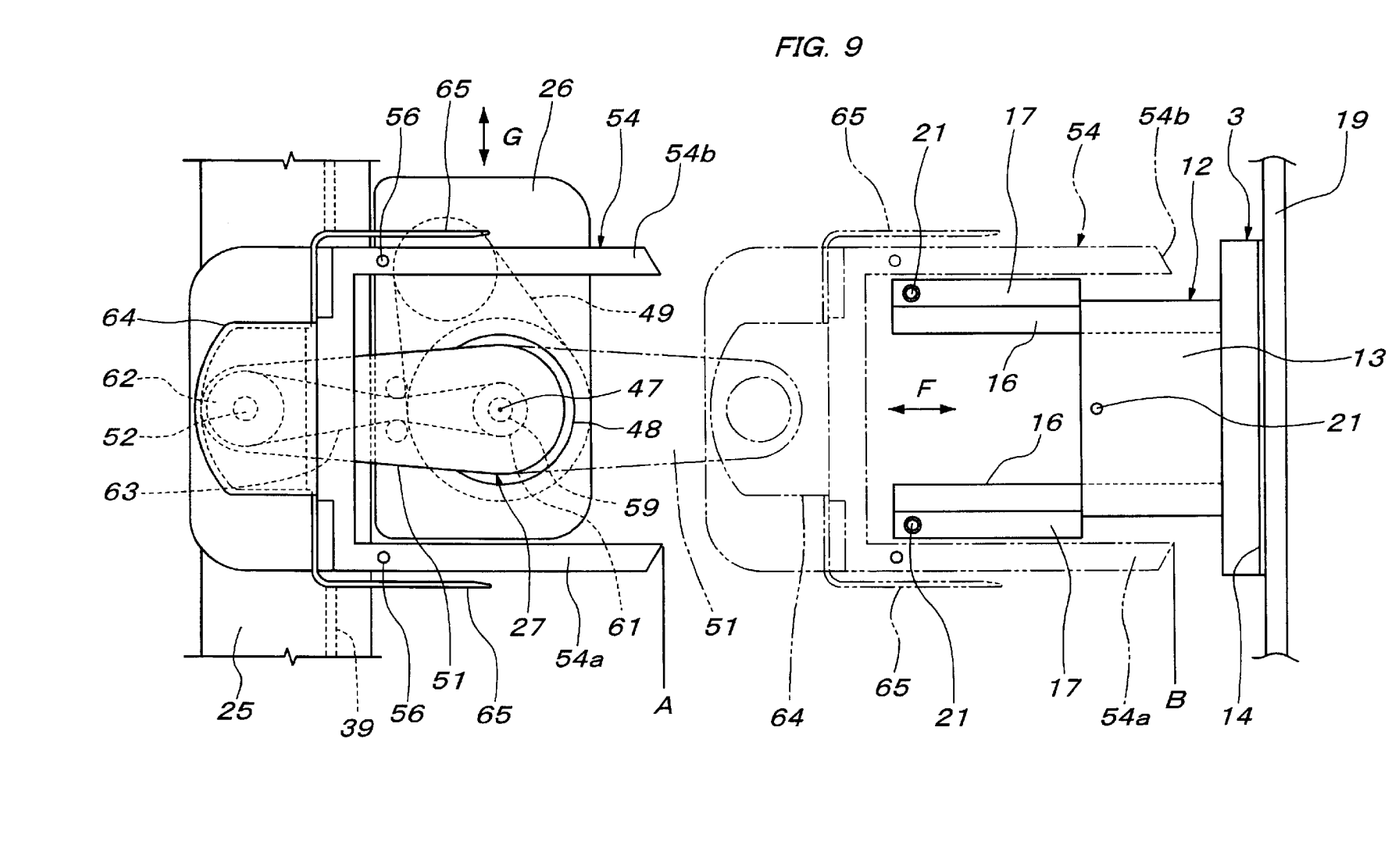
FIG. 9 is a plan view of the protruder/retractor.
Figure 10:
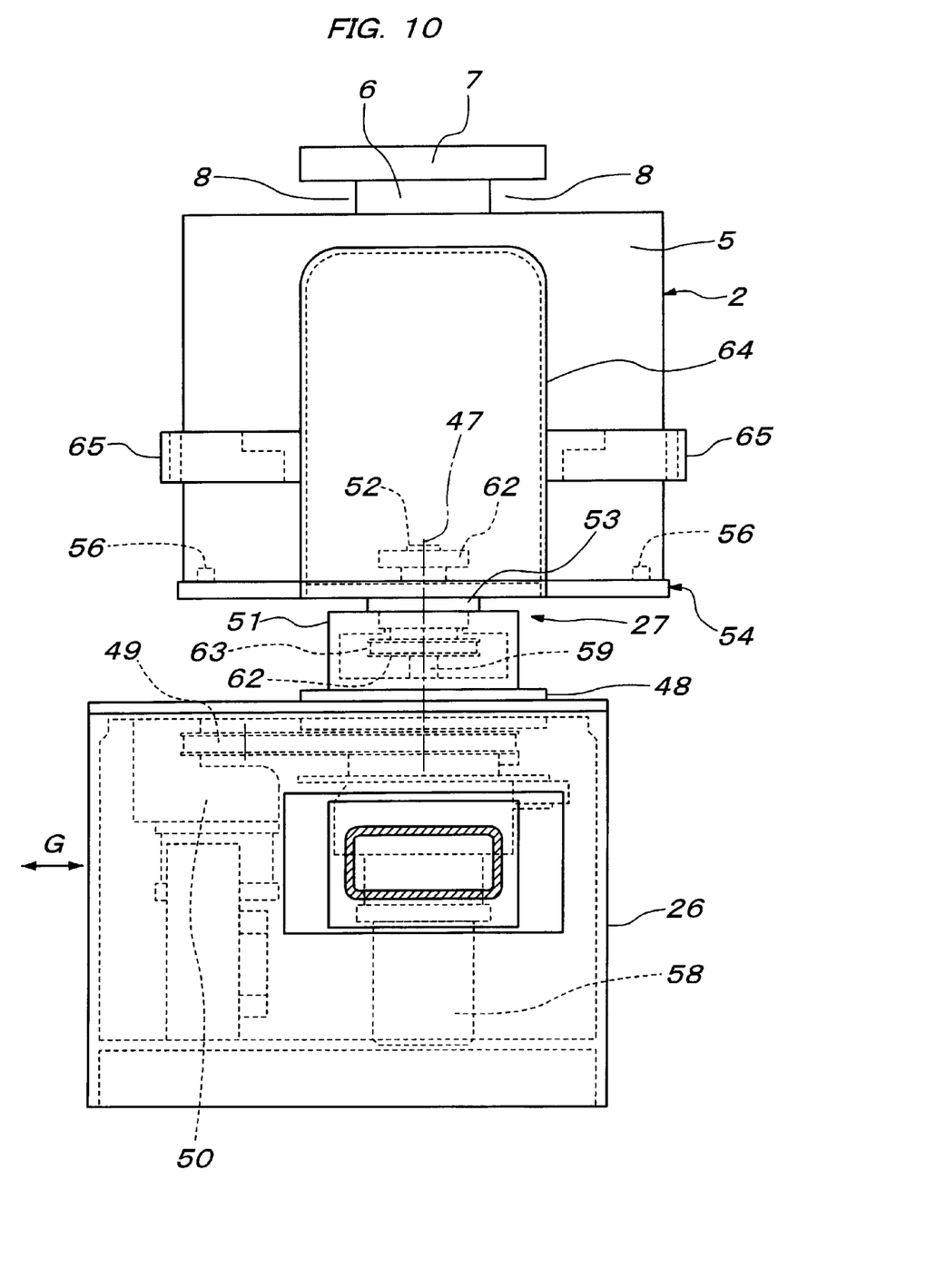
FIG. 10 is a rear view of the protruder/retractor.

As shown in FIGS. 8–10, the top the movable unit 26 supports a rotary table 48, which can rotate on a vertical axis 47. The movable unit 26 houses a table drive 50, which is interlocked with the rotary table 48 by a timing belt 49 etc.

The protruder/retractor 27 takes the form of a folding arm and consists of an arm 51 and a fork 54 in the form of a plate. One end of the arm 51 is fixed to the rotary table 48. The free end of the arm 51 supports a vertical shaft 52 with a bearing 53 interposed between them. One end of the fork 54 is fixed to the vertical shaft 52. The movable unit 26 houses an arm drive such as a servo motor 58 for driving the protruder/retractor 27. The arm drive 58 includes an output shaft 59, which extends through the rotary table 48 coaxially with the vertical axis 47. The arm 51 takes the form of a hollow case and houses a driving mechanism 60. The driving mechanism 60 includes a first wheel 61, a second wheel 62 and a timing belt 63, which interlocks the wheels 61 and 62. The first wheel 61 is fixed to the output shaft 59. The second wheel 62 is fixed coaxially to a lower portion of the vertical shaft 52 fixed to the fork 54.

As shown in FIG. 2, the free end of the fork 54 has a width of W1, and each shelf 12 has a width of W2 narrower than W1. The free end of the fork 54 includes a pair of arms 54a and 54b formed on both sides. The arms 54a and 54b define a space 55 between them, which is open at its front end, top and bottom. The space 55 has a width W3 greater than the shelf width of W2 and narrower than the fork end width of W1 so that the space 55 and shelf 12 can move relatively up and down.

Each of the fork arms 54a and 54b has an outer positioning pin 56 protruding upward from its top for engagement with one outer positioning hole 10 of each container 2. As shown in FIGS. 8–10, the end of the fork 54 that is opposite to the arms 54a and 54b is fitted with a chassis 64 in the form of a hollow case on it. The chassis 64 includes a pair of arms 65 formed on both sides for preventing the lateral movement of the container 2 supported on the fork arms 54a and 54b.

The operation of the storage system is described below.

As shown with solid lines in FIGS. 8 and 9, activation of the table drive 50 rotates through the timing belt 49 etc. the arm 51 together with the rotary table 48 on the vertical axis 47 until the free end of the arm 51 is positioned over the lift 25. In the meantime, activation of the arm drive 58 rotates through the driving mechanism 60 etc. the fork 54 together with the vertical shaft 52 relative to the arm 51 to fold the protruder/retractor 27 until the fork 54 retracts to a retracted position A, where it is positioned over the arm 51.

Activation of the table drive 50 in the opposite direction rotates the arm 51 together with the rotary table 48 on the vertical axis 47 to move the free end of the arm 51 away from the lift 25 toward one of the racks 3. In the meantime, activation of the arm drive 58 in the opposite direction rotates the fork 54 together with the vertical shaft 52 in the opposite direction relative to the arm 51 to stretch the folded protruder/retractor 27, as shown with two-dot chain lines in FIG. 9, until the fork arms 54a and 54b protrude in the directions F into a protruded position B, where they are positioned over or under a shelf 12.

The process for loading a container 12 on the top of a shelf 12 includes supporting the container 2 on the arms 54a and 54b of the fork 54 retracted in the retracted position A (solid lines in FIG. 9), moving the lift 25 up and down and the movable unit 26 in the right and left directions G with the container 2 so supported, and stopping the lift 25 and movable unit 26 with the retracted fork 54 positioned in front of and above the shelf 12. Because the outer positioning pins 56 of the fork 54 are engaged with the outer positioning holes 10 of the container 2 supported on the fork 54, the container 2 is positioned relative to it so as not to be shifted by its movement.

Subsequently, the fork 54 is moved from the retracted position A to the protruding position B (two-dot chain lines in FIG. 9) so that, as shown in FIG. 4a, the container 2 supported on the fork arms 54a and 54b may be positioned over the shelf 12. Then, as shown in FIG. 4b, the lift 25 is lowered so that the shelf 12 can move relatively upward into the space 55 of the fork 54 until the container 2 on the fork arms 54a and 54b transfers onto the deck 20 of the shelf 12. At the same time, the outer positioning pins 56 of the fork 54 are pulled out of the outer positioning holes 10 of the container 2, while the inner positioning pins 21 of the shelf 12 are inserted into the inner positioning holes 9 of the container 2. This positions the container 2 on the shelf deck 20 in such a manner that the container 2 may not shift. Thus, the container 2 is put into storage on the top of the shelf 12. Thereafter, the empty fork 54 may be retracted from the protruded position B to the retracted position A.

Figure 5A:
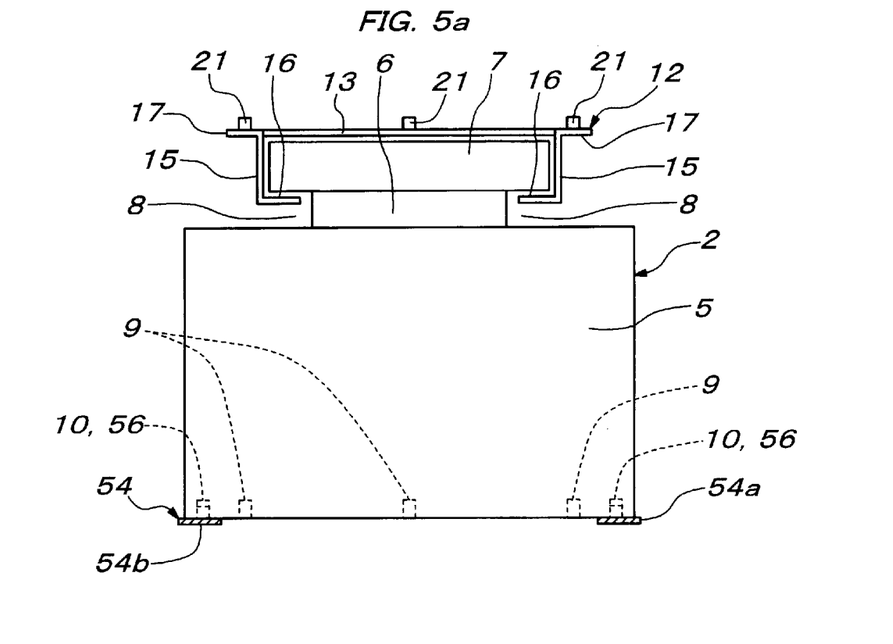

The process for loading a container 12 in such a manner that it hangs from a shelf 12 includes supporting the container 2 on the arms 54a and 54b of the fork 54 retracted in the retracted position A, as stated above, stopping the retracted fork 54 in front of and below the shelf 12, and moving the fork 54 from the retracted position A to the protruded position B to move the container 2 on the fork arms 54a and 54b to a position just under the shelf 12. This, as shown in FIG. 5a, causes the head 7 of the container 2 to be inserted into the space between the side plates 25 of the shelf 12. In other words, the level of the fork 54 is determined in such a manner that the container head 7 can be inserted into the space between the side plates 25 of the shelf 12.

Figure 5B:
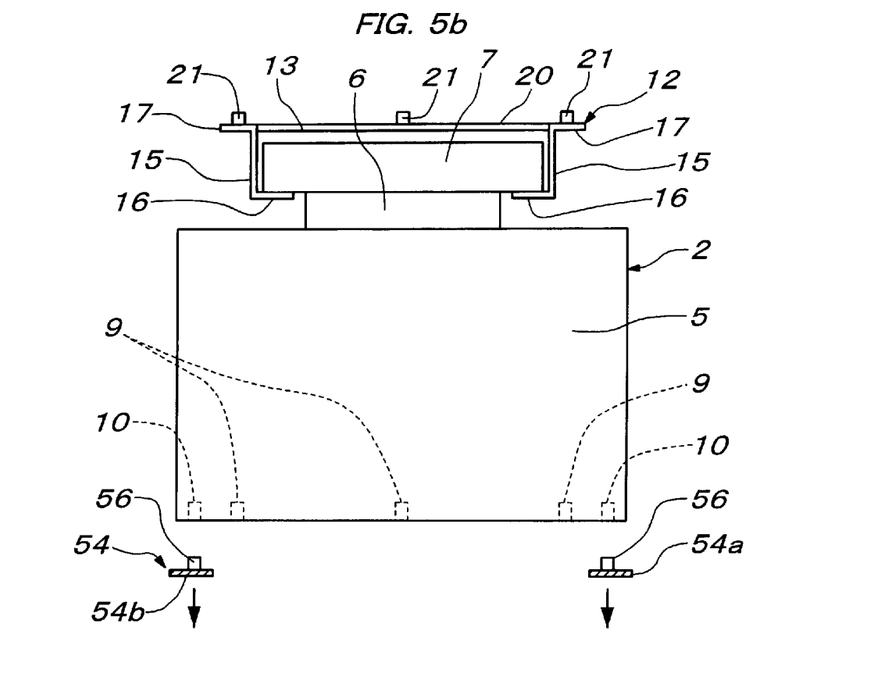

Subsequently, as shown in FIG. 5b, the fork 54 supporting the container 2 is lowered with the lift 25 so that the bottom of the container head 7 can engage with the engaging flanges 16 of the shelf 12. The fork 54 is further lowered until the container 2 hangs from the shelf 12. This causes the outer positioning pins 56 of the fork 54 to be pulled out of the outer positioning holes 10 of the container 2. Thus, the container 2 is put into storage under the shelf 12. Thereafter, the empty fork 54 may be retracted from the protruded position B to the retracted position A.

Thus, as shown in FIG. 6, two containers 2 can be held on the upper and lower sides of each shelf 12. Consequently, for storage of three vertically spaced horizontal rows of containers 2, there is no need for shelves for the middle row c between the top row a and bottom row b as is necessary for the conventional storage system shown in FIG. 12.

The process for unloading a container 2 stored on the top of a shelf 12 includes stopping the empty fork 54 midway between the top and bottom of the shelf 12, protruding the fork 54 from the retracted position A to the protruded position B and, as shown in FIG. 4b, moving the shelf 12 relatively into the space 55 of the fork 54 to position the fork arms 54a and 54b on both sides of the shelf 12 under the container 2. Then, the lift 25 lifts the fork 54 so that, as shown in FIG. 4a, the fork arms 54a and 54b may lift the container 2 from the deck 20 of the shelf 12. Consequently, the inner positioning pins 21 of the shelf 21 are pulled out of the inner positioning holes 9 of the container 2, while the outer positioning pins 56 of the fork 54 engage with the outer positioning holes 10 of the container 2. This positions the container 2 on the fork 54 in such a manner that the container 2 may not shift. Thereafter, the fork 54 supporting the container 2 is moved from the protruded position B to the retracted position A. This takes the container 2 on the top of the shelf 12 out of storage.

The process for unloading a container 2 hanging from a shelf 12 includes stopping the empty fork 54 below the shelf 12 and protruding the fork 54 from the retracted position A to the protruded position B so that, as shown in FIG. 5b, the fork arms 54a and 54b may be positioned under the container 2. Then, the lift 25 lifts the fork 54 so that, as shown in FIG. 5a, the fork arms 54a and 54b may slightly lift the container 2. This causes the head 7 of the container 2 to float slightly and disengage from the engaging flanges 16 of the shelf 12. Thereafter, the fork 54 supporting the container 2 is moved from the protruded position B to the retracted position A to pull out the engaging space 8 of the container 2 from the engaging flanges 16 of the shelf 12. This takes out of storage the container 2 under the shelf 12.

As described already, the fork 54 scoops a container 2 and supports its bottom. Alternatively, the fork 54 might be replaced by a pair of arms for holding both sides of the container body 5 and picking up the container 2.

As shown in FIG. 7, the loader/unloader 4 consists of a lift 25, a movable unit 26 and a protruder/retractor 27 in the form of a fork. The lift 25 can be guided vertically along the racks 3 and carries the movable unit 26. The movable unit 26 can move in the right and left directions G and carries the protruder/retractor 27. Alternatively, the loader/unloader 4 might be replaced by a stacker crane for an automatic warehouse. Specifically, the loader/unloader 4 might consist of a carriage, a lift and a fork. The carriage could run on the floor of the passage 23 and might carry the lift. The lift could move vertically and might carry the fork, which could protrude and retract.

As shown in FIGS. 2 and 3, each shelf 12 has three inner positioning pins 21, and each container 2 has three inner positioning holes 9. Alternatively, the number of pins 21 might be one, two, four or more. Likewise, the number of holes 9 might be one, two, four or more. As also shown, the fork 54 has two outer positioning pins 56, and each container 2 has two outer positioning holes 10. Alternatively, the number of pins 56 might be one, three or more. Likewise, the number of holes 10 might be one, three or more. The positioning pins 21 and 56 act as positioning protrusions and might be replaced by other protrusions or projections.

The storage system 1 is described as equipment for storage of containers 2 for containing semiconductors (wafers). Alternatively, containers for other things might be stored in the storage system 1, or articles other than containers might be store.

What is claimed is:

1. A storage system for storing therein an article having engaging means, the storage system comprising:
    a shelf for supporting the article; and
    a loader/unloader for loading and unloading the shelf;
    the shelf including a deck formed on the upper side thereof, on which the article can be placed, and an engaging part formed on the lower side thereof for engaging with the engaging means of the article to hold the article under the shelf;
    the engaging means and the engaging part being able to engage with and disengage from each other in the directions in which the article can be loaded and unloaded.

2. A storage system according to claim 1 wherein the article has a positioning hole formed in the bottom thereof, the loader/unloader and the shelf deck each including a positioning protrusion that can engage with and disengage from the positioning hole.

3. A storage system according to claim 2 wherein the shelf consists of vertically spaced horizontal rows of shelves, the loader/unloader consisting of:
    a movable unit that can move vertically and horizontally; and
    a fork carried by the movable unit for moving toward and away from the shelf to scoop the article, the positioning protrusion being formed on the fork.

4. A storage system according to claim 3 wherein the fork is wider than the shelf and formed with a space through which the shelf can move vertically relative to the fork.

* * * * *